Sept. 2, 1947.                T. CARROLL                    2,426,922
                        AUGER CONVEYOR FOR COMBINES
                    Filed Sept. 4, 1942          3 Sheets-Sheet 2
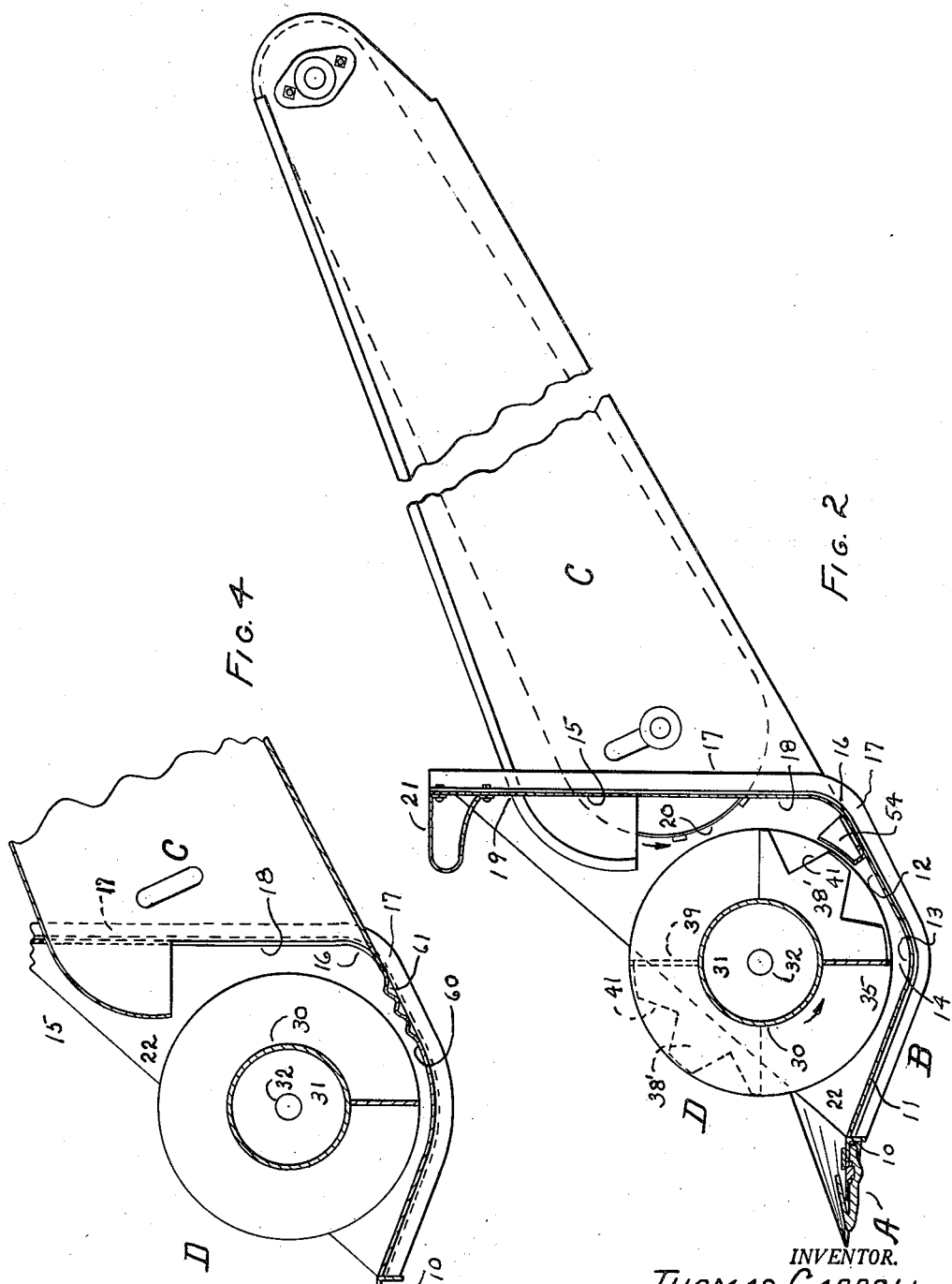
INVENTOR.
THOMAS CARROLL
BY
ATTORNEY Sept. 2, 1947.　　　　T. CARROLL　　　　2,426,922
AUGER CONVEYOR FOR COMBINES
Filed Sept. 4, 1942　　　3 Sheets-Sheet 3
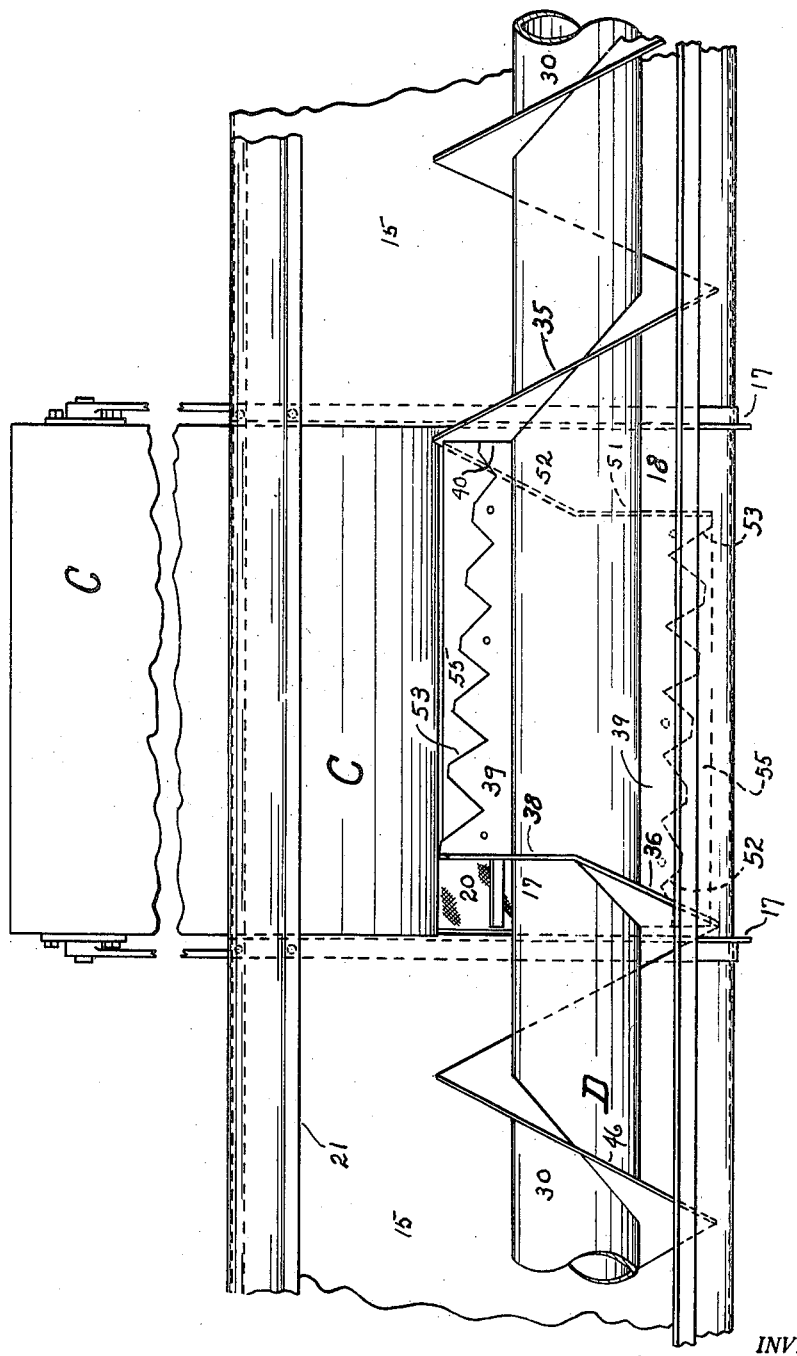
INVENTOR.
THOMAS CARROLL
BY　A.S.Kroh
ATTORNEY Patented Sept. 2, 1947

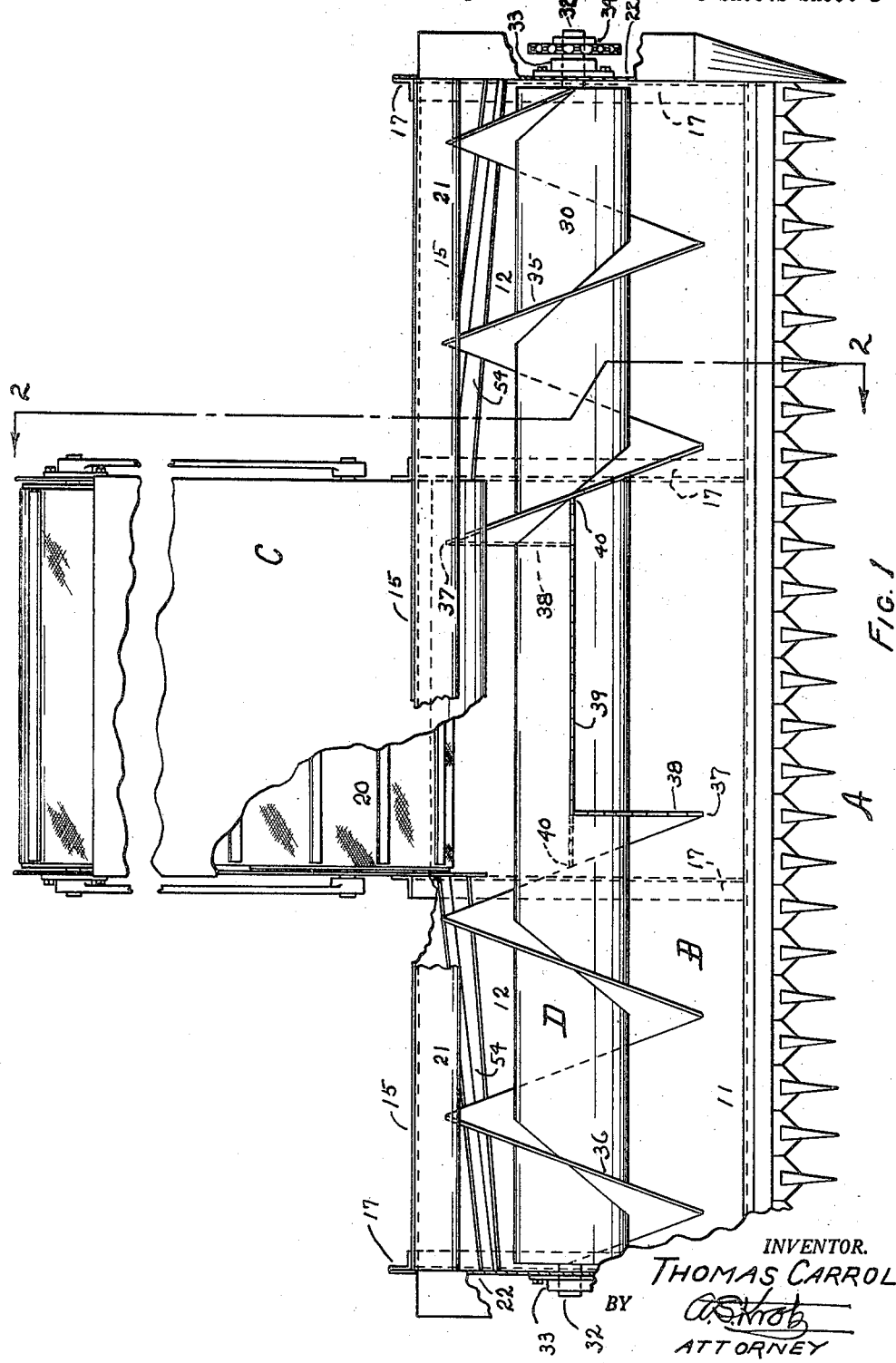

2,426,922

UNITED STATES PATENT OFFICE 2,426,922

AUGER CONVEYOR FOR COMBINES

Thomas Carroll, Toronto, Ontario, Canada, assignor to Massey-Harris Co. Ltd., Toronto, Ontario, Canada, a corporation of Canada Application September 4, 1942, Serial No. 457,291

1 Claim. (Cl. 56—158)

Generally stated, an object of the present invention is to provide means for conveying the grain from the cutter bar to a relatively narrow elevator which is simple, easily manufactured at low cost and capable of continuous operation in all crop conditions without the attention of the operator.

When wheat and the like are ready to be harvested, it is important that it be harvested without delay; therefore it is an object of my invention to provide means for moving the grain into the outlet of the trough which will be positive in its operation and without danger of moving the grain to the elevator in bunches or unevenly.

I accomplish the foregoing objects by means of a suitably shaped trough having grain moving augers, guiding means and especially designed means for moving the grain from between the ends of the augers into the elevator as uniformly as it is cut by the cutter bar.

To these and other useful ends, my invention consists of parts, combinations of parts, or their equivalents, and mode of operation, as hereinafter set forth and claimed and shown in the accompanying drawings in which:

Fig. 1 is a top view of the preferred form of my device illustrating fractionally the elevator which receives the grain from the trough outlet.

Fig. 2 is a transverse sectional view of the device shown in Figure 1, taken on line 2—2 of this figure.

Fig. 3 is a fractional view of the device shown in Figure 1 but illustrating the auger turned so members 39 are at right angles to the line of vision which is somewhat lower than in Figure 1 and omitting the cutter bar and its fastening to the pan.

Fig. 4 illustrates fractionally the device shown in Figure 1 but showing a modification of the pan.

As thus illustrated, the cutter bar in its entirety is designated by reference character A. The pan is designated in its entirety by reference character B. The elevator in its entirety is designated by reference character C and the shaft and augers, including the grain moving means between the augers are designated in their entireties by reference character D.

Member A is a standard commonly known cutter bar. The pan, as illustrated in Figures 1 and 2 is secured at its front end to member A as at 10 in any well known manner. The pan is made from sheet metal, the forward and rear bottoms 11 and 12 of which are preferably flat, the flat portions being connected together by a curve as at 13 so as to form a channel 14 directly under member D.

The pan is provided with a rear upwardly extending guard panel 15 which is preferably vertical, as illustrated in Figure 2 and is connected to member 12 by means of a curved portion 16. The pan and members 15 are strengthened by means of a number of L-irons 17, one for each end of the pan and at least one on opposite sides of an outlet 18 which is positioned preferably midway the ends of the pan and cut out of member 15, the cut-away portion terminating as at 19 at the top and somewhere within curve 16 at the bottom, for the reception of the receiving end of elevator C.

Member C is provided with suitable side, top and bottom panels and preferably an endless elevator apron 20. This member C is too well known to require further illustration or description.

In order to stiffen the top of member 15, I provide a sheet metal boom 21 which extends the full length of the pan. The ends of the pan are partially closed by means of plates 22—22. Member D comprises a shaft 30 preferably a large tube, the ends of which are filled by means of members 31 into which are concentrically mounted stub shafts 32—32, the shafts protruding through member 22 and being mounted on this member by means of anti-friction bearings 33—33.

At one end of one of shafts 32 I mount a sprocket 34 which is driven by a suitably positioned shaft and chain (not shown). Tube 30 has mounted on opposite ends auger conveyer members 35 and 36, these members extending from the end of member 30 inwardly, terminating as at 37—37.

I provide members 38—38 which are each secured at one end to the inner ends of a member 35 or 36. These members extend from the auger end in the opposite direction from the direction of travel and are in the form of a sector, the inner edges being secured to member 30, the rear ends terminating preferably about 90 degrees from their front ends, and being substantially on a radius with the axis of member 30. I provide two plates 39—39, each plate being secured to the rear end of a member 38. The other ends, it will be noted, are secured to an auger element a short distance from the end thereof.

It will be seen that the grain will be moved toward the center of the platform where it will be engaged by members 38 and 39 and moved rearwardly through outlet 18, these members acting to confine the grain and urge it into elevator C.

Clearly member 15 will act to prevent the grain from moving rearwardly out of the pan. Members 39 will engage the grain and positively move it into outlet 18 because members 38 will prevent it from moving transversely past the ends of the outlet.

Fig. 3 is similar to Figure 1 except to provide members 39 with plates 55 which are removably attached and members 38 and 39 are notched as at 41 as illustrated in Figure 2. These notches operate perfectly except in flax or grain which tends to wind on the auger. Under these conditions plates 55 are attached to plates 39 being smooth on their outer surfaces so the device will operate satisfactorily in flax and the like, the principal function of notches is to more effectively seize the grain as it falls rearwardly between the inner ends of members 35 and 36.

Members 49 and 51 are preferably the same height as members 45 and 46 and one end of plate 39 is preferably the same height as member 51, the other end being preferably somewhat narrower as at 52. The outer edges of plates 39 are preferably notched as at 53—53; thus it will be seen that the device shown in Figure 3 will operate similar to the device shown in Figures 1 and 2.

In harvesting some grain and under some conditions, notches 53 may not be advisable. In this event, smooth edged plates 55 may be attached to members 39.

Referring again to Figures 1 and 2. On member 12 and someplace between members 13 and 16, I position an L-iron 54 which is preferably angled somewhat as illustrated in these figures. This L-iron extends from the outer ends of the pan to the adjacent sides of outlet 18; thus as the grain is moved rearwardly and inwardly by members 35 and 36, it will be engaged by this angle iron and the grain will be urged toward the center of the pan. In some installations, members 38' (see Figure 2) may be notched as at 41, these notches answering to grip the grain and assist in moving it toward the outlet.

Referring now to Figure 4. Members A, C and D and members 11 and 14 in this figure may be similar to that shown in the other figures; however the bottom portion 60 of the pan is provided with one or more corrugations 61. As illustrated in this design, the corrugations will act similar to L-irons 54 to urge the grain toward the center of the pan. These corrugations may be either parallel to the axis of member D or angled similar to member 54.

It will be noted by scrutinizing Figures 2 and 4 that members 12 and 60 are flat; thus forming a convenient surface on which to attach member 54 or to form members 61 either at an angle or parallel to the axis of member D.

It will be seen that I have disclosed a very simple cutting mechanism having positive means for moving the grain toward the center of the pan and out the outlet in the rear of the pan. Clearly many minor detail changes may be made without departing from the spirit and scope of the present invention as recited in the appended claim.

Having thus shown and described my invention, I claim:

A grain cutting and conveying device of the character described; comprising a cutter bar, a grain trough secured to the rear side of said cutter bar, a shaft positioned over said grain trough and being rotatably mounted at its ends on the ends of the trough, an outlet in the rear of said trough intermediate the ends of the trough, grain moving means mounted on said shaft, comprising oppositely directed auger elements extending from the ends of the trough to a short distance past the transverse plane of the adjacent ends of said outlet and with their inner ends positioned on opposite sides of the shaft, sector plates secured to the inner ends of said auger elements, each extending rearwardly for a short distance, longitudinally positioned plates secured at one end to the rear end of a sector plate with their other ends secured to the other auger element, whereby pockets are formed on opposite sides of the shaft to thereby confine the grain being moved into the outlet to a width less than the length of said outlet.

THOMAS CARROLL.

REFERENCES CITED

The following references are of record in the file of this patent:

UNITED STATES PATENTS

| Number | Name | Date |
|---|---|---|
| 1,859,586 | Gottschall et al. | May 24, 1932 |
| 1,972,031 | Pierson | Aug. 28, 1934 |
| 2,122,673 | Sheets | July 5, 1938 |
| 2,245,997 | Olson | June 17, 1941 |
| 2,292,958 | Millard et al. | Aug. 11, 1942 |